(12) United States Patent
Wilson et al.

(10) Patent No.: US 9,570,958 B2
(45) Date of Patent: Feb. 14, 2017

(54) GENERATOR WITH CONTROLLED AIR COOLING AMPLIFIER

(71) Applicant: Rolls-Royce Corporation, Indianapolis, IN (US)

(72) Inventors: Eric E. Wilson, Mooresville, IN (US); Donald Klemen, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 14/679,432

(22) Filed: Apr. 6, 2015

(65) Prior Publication Data
US 2015/0288253 A1 Oct. 8, 2015

Related U.S. Application Data

(60) Provisional application No. 61/976,801, filed on Apr. 8, 2014.

(51) Int. Cl.
| | | |
|---|---|---|
| *F02B 63/04* | (2006.01) | |
| *H02K 7/18* | (2006.01) | |
| *H02K 9/04* | (2006.01) | |
| *F01D 15/10* | (2006.01) | |
| *F01D 25/08* | (2006.01) | |
| *F02C 6/08* | (2006.01) | |
| *H02K 9/00* | (2006.01) | |
| *F02C 6/00* | (2006.01) | |
| *F02C 7/22* | (2006.01) | |
| *H02K 19/38* | (2006.01) | |

(52) U.S. Cl.
CPC .................. *H02K 9/04* (2013.01); *F01D 15/10* (2013.01); *F01D 25/08* (2013.01); *F02C 6/08* (2013.01); *H02K 7/1823* (2013.01); *H02K 9/00* (2013.01); *F05D 2220/76* (2013.01); *F05D 2260/20* (2013.01); *H02K 19/38* (2013.01); *Y02T 50/671* (2013.01); *Y02T 50/676* (2013.01)

(58) Field of Classification Search
USPC ... 290/1 B; 60/204, 774, 778, 782, 785, 791
See application file for complete search history.

(56) References Cited

U.S. PATENT DOCUMENTS

| | | | |
|---|---|---|---|
| 4,046,492 A | | 9/1977 | Inglis |
| 4,086,757 A | * | 5/1978 | Karstensen ............. F01D 5/082 |
| | | | 415/115 |
| 4,474,001 A | * | 10/1984 | Griffin ...................... F02C 7/16 |
| | | | 60/204 |

(Continued)

FOREIGN PATENT DOCUMENTS

| | | |
|---|---|---|
| DE | 102006043550 A1 | 8/2007 |
| JP | H0382356 A | 4/1991 |

(Continued)

OTHER PUBLICATIONS

Extended European Search Report mailed Sep. 10, 2015.

*Primary Examiner* — Pedro J Cuevas
(74) *Attorney, Agent, or Firm* — Fishman Stewart PLLC

(57) ABSTRACT

A turbine engine includes an electrical system having at least two generator circuits, one coupled to a high pressure portion of a gas turbine engine and the other coupled to a low pressure portion of the gas turbine engine. The electrical system actively cools an electrical generator during operation in order to ensure proper operation as well as extend the lifespan of the generator.

20 Claims, 4 Drawing Sheets

(56) References Cited

U.S. PATENT DOCUMENTS

| | | | | |
|---|---|---|---|---|
| 5,048,288 A | * | 9/1991 | Bessette | F01D 11/24 415/116 |
| 5,097,660 A | | 3/1992 | Shekleton | |
| 5,365,738 A | * | 11/1994 | Etheridge | F23C 7/008 239/126 |
| 5,497,615 A | * | 3/1996 | Noe | F02C 6/20 60/39.511 |
| 6,437,468 B2 | * | 8/2002 | Stahl | H02K 9/00 310/261.1 |
| 6,568,203 B1 | | 5/2003 | Leathers | |
| 6,634,596 B2 | * | 10/2003 | Albero | B64D 13/06 244/53 A |
| 6,798,079 B2 | * | 9/2004 | Nelson | F01D 25/12 290/2 |
| 6,826,910 B1 | | 12/2004 | Easton | |
| 6,851,267 B2 | * | 2/2005 | Bruno | F02C 7/32 60/39.83 |
| 6,968,697 B2 | * | 11/2005 | Nguyen | F02C 7/06 60/772 |
| 7,013,651 B2 | * | 3/2006 | Bruno | F02C 7/32 60/39.83 |
| 7,152,410 B2 | * | 12/2006 | Sheoran | F02C 7/12 239/265.11 |
| 7,246,482 B2 | * | 7/2007 | Mahoney | F02C 3/13 60/204 |
| 7,654,085 B2 | | 2/2010 | Dumas et al. | |
| 7,862,293 B2 | * | 1/2011 | Olver | F01D 25/12 415/169.1 |
| 7,966,831 B2 | * | 6/2011 | Kraft | F02K 3/06 60/226.1 |
| 8,029,244 B2 | | 10/2011 | Dumas et al. | |
| 8,046,989 B2 | | 11/2011 | VanderGriend et al. | |
| 8,659,185 B2 | * | 2/2014 | Coons | H02J 3/28 307/44 |
| 8,876,465 B2 | * | 11/2014 | Stretton | F01D 25/12 415/116 |
| 9,022,737 B2 | * | 5/2015 | Piggush | F01D 5/186 416/97 R |
| 9,239,009 B2 | * | 1/2016 | Taguchi | F02C 6/18 |
| 9,267,434 B2 | * | 2/2016 | Campbell | F02K 3/115 |
| 9,316,153 B2 | * | 4/2016 | Patat | F01D 9/02 |
| 2004/0007878 A1 | | 1/2004 | Nelson | F01D 25/12 290/2 |
| 2004/0118128 A1 | * | 6/2004 | Bruno | F02C 7/32 60/801 |
| 2005/0056019 A1 | * | 3/2005 | Nguyen | F02C 7/06 60/726 |
| 2005/0274117 A1 | * | 12/2005 | Sheoran | F02C 7/12 60/782 |
| 2006/0026967 A1 | * | 2/2006 | Bruno | F02C 7/32 60/802 |
| 2008/0230651 A1 | * | 9/2008 | Porte | B64D 13/06 244/118.5 |
| 2008/0271433 A1 | * | 11/2008 | Olver | F01D 25/12 60/266 |
| 2010/0078938 A1 | * | 4/2010 | Coons | H02J 3/28 290/7 |
| 2010/0139288 A1 | * | 6/2010 | Rago | F01D 11/24 60/785 |
| 2010/0170262 A1 | * | 7/2010 | Kaslusky | B64D 13/00 60/778 |
| 2010/0180571 A1 | * | 7/2010 | Zysman | F02C 7/14 60/204 |
| 2010/0219638 A1 | | 9/2010 | Gozdawa | |
| 2011/0088405 A1 | * | 4/2011 | Turco | F01D 5/081 60/782 |
| 2012/0137651 A1 | * | 6/2012 | Taguchi | F02C 6/18 60/39.183 |
| 2012/0192578 A1 | * | 8/2012 | Finney | B64D 13/06 62/87 |
| 2013/0039777 A1 | * | 2/2013 | Piggush | F01D 5/186 416/97 R |
| 2014/0111042 A1 | * | 4/2014 | Hartig | H02K 55/02 310/62 |
| 2014/0205447 A1 | * | 7/2014 | Patat | F01D 9/065 415/177 |
| 2015/0381013 A1 | * | 12/2015 | Davies | F01D 5/10 290/52 |
| 2016/0010510 A1 | * | 1/2016 | Sharp | F02C 6/18 60/774 |
| 2016/0032841 A1 | * | 2/2016 | Ronan | B64D 13/06 415/121.3 |
| 2016/0090913 A1 | * | 3/2016 | Taguchi | F02C 6/18 60/734 |
| 2016/0169109 A1 | * | 6/2016 | Liu | F04D 29/522 60/782 |
| 2016/0169119 A1 | * | 6/2016 | Musci | F02C 9/18 60/782 |
| 2016/0169154 A1 | * | 6/2016 | Rao | F02C 9/16 701/100 |
| 2016/0177759 A1 | * | 6/2016 | Tuertscher | F01D 5/282 415/200 |
| 2016/0178199 A1 | * | 6/2016 | Burd | F02C 7/18 60/782 |
| 2016/0178285 A1 | * | 6/2016 | Pal | B64D 13/06 165/104.19 |
| 2016/0201518 A1 | * | 7/2016 | Tong | F01K 23/108 60/774 |
| 2016/0201908 A1 | * | 7/2016 | Drake | F23R 3/002 60/782 |
| 2016/0201914 A1 | * | 7/2016 | Drake | F02C 7/24 60/782 |

FOREIGN PATENT DOCUMENTS

| | | |
|---|---|---|
| JP | 2005012891 A | 1/2005 |
| WO | WO-0227150 A1 | 4/2002 |

* cited by examiner

GENERATOR WITH CONTROLLED AIR COOLING AMPLIFIER

CROSS-REFERENCE TO RELATED APPLICATIONS

This application claims priority to U.S. Provisional Patent Application No. 61/976,801, filed Apr. 8, 2014, the contents of which are hereby incorporated in their entirety.

FIELD OF TECHNOLOGY

An improved integrated design and control of a gas turbine is disclosed. More particularly, performance and efficiency are improved by optimizing the thermal control of the generator. The improvements are applicable to turbines used for propulsive power in marine, land, air, and underwater applications, as examples.

BACKGROUND

It has become increasingly desirable to improve the overall system design and operation of gas turbines. In a system having a typical gas turbine engine, electrical power is extracted via an electrical generator to supply electrical power to control systems, actuators, weapons systems, climate control systems, and the like. Electrical storage, such as a battery, is typically provided to operate such systems when the gas turbine engine is not running or to provide power for starting the gas turbine engine. In some known gas turbine engines, the gas turbine engine includes a high pressure shaft and a lower pressure shaft, and the electrical generator is coupled to one of the high and low pressure shafts.

The electrical generator commonly generates thermal energy when in operation. It is important to actively cool the electrical generator during operation in order to ensure proper operation as well as extend the lifespan of the generator. This is commonly accomplished through the use of a fan attached to the generator shaft. The fan adds undesirable weight and complexity to the generator. In addition, when the generator is operating at altitude in an aircraft there becomes a reduction in air density. This results in a reduction in air-flow, which in turn reduces cooling. Increasing fan velocity may be utilized to partially address these losses, but is not always efficient or practical.

Overcoming these concerns would be desirable, could improve generator efficiency, and could save the industry substantial resources.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine and schematic of an electrical system coupled thereto are described herein and are shown in the attached drawings. The electrical system includes at least two generator circuits, one coupled to a high pressure portion of a gas turbine engine and the other coupled to a low pressure portion of the gas turbine engine.

Figure 1:
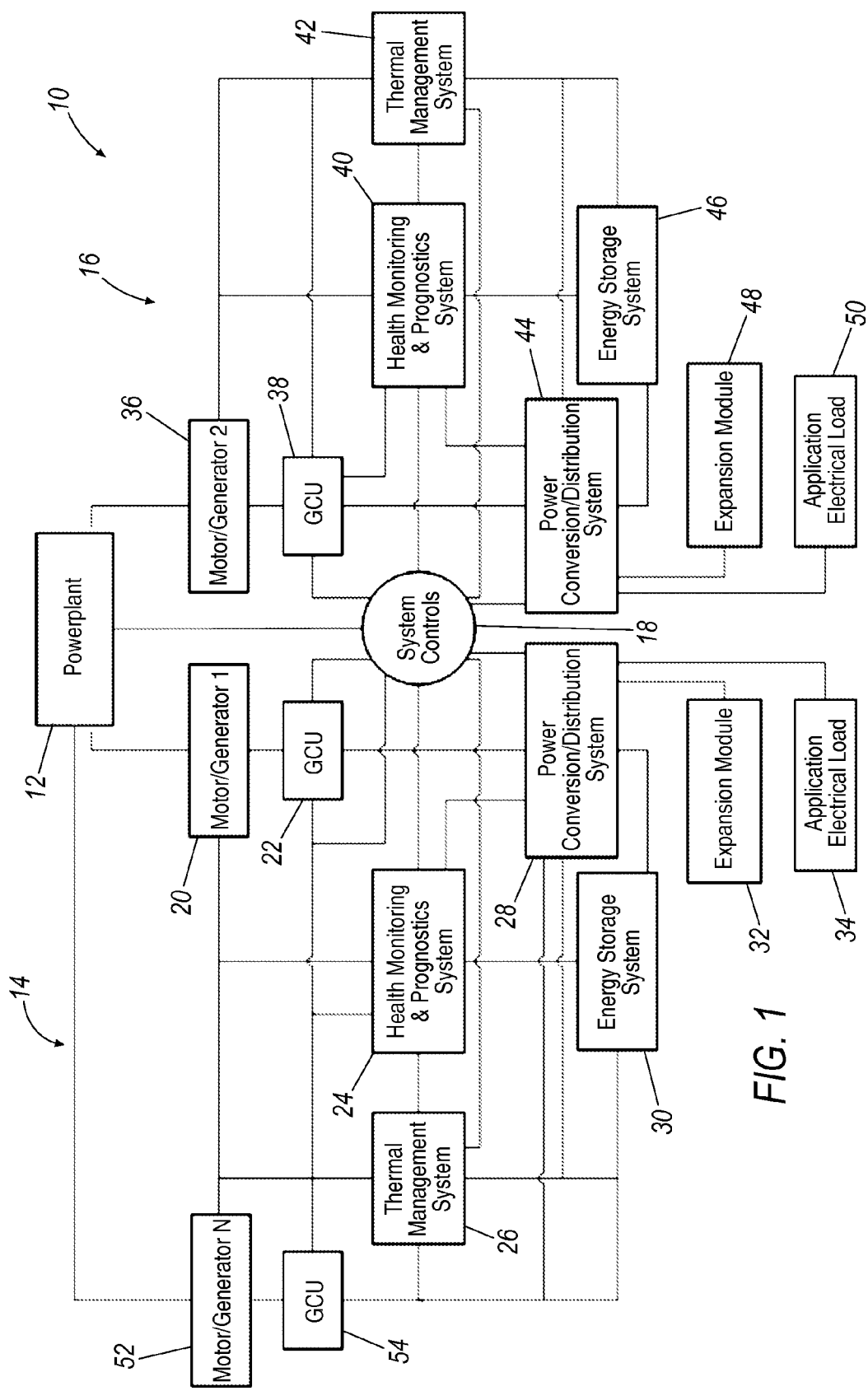
FIG. 1 is a schematic illustration of an electrical system coupled to a gas turbine engine, according to one example.

FIG. 1 illustrates an electrical system 10 in which a power plant or engine 12, such as a gas turbine engine, provides electrical power to a first power circuit 14 and a second power circuit 16. A system controller 18 is coupled to engine 12 and also to first and second circuits 14, 16. First power circuit 14 includes a motor/generator 20 and a General Control Unit (GCU) 22 coupled thereto. GCU 22 is also coupled to other components within first power circuit 14, such as a health monitoring and prognostics system 24, a thermal management system 26, and a power conversion/distribution system 28. First power circuit 14 also includes an energy storage system 30, an expansion module 32, and application electrical load(s) 34. System controller 18 is configured to regulate power flow (such as electrical currents and voltages within system 10) to provide power to various electrical busses. The power may be DC, AC, or conversion therebetween. System controller 18 may also be configured to execute computer program instructions to control the operation of engine 12, including fuel flow, or the position of any variable geometry systems (e.g., from the flight control system of an aircraft or from a steering system of a ship).

Health monitoring and prognostics system 24 is generally a unit that monitors the health of system components, and may be used to estimate component life based on sensor feedback received from components within engine 12. Thermal management system 26 includes pumps, expansion valves, and the like, as well as a controller, to provide coolant for the purposes of climate control, and other system operations. Power conversion/distribution system 28 receives electrical power from motor/generator 20 via GCU 22, and converts the power to a more useable form such as a DC voltage for storage in energy storage system 30, expansion module 32, and application electrical load(s) 34. The energy storage system 30 may include a battery or other energy storage system. Energy storage system 30 stores energy for providing power when engine 12 is not running (i.e., not generating power), but also to provide power to motor/generator 20 to provide starting power to engine 12 during startup. Expansion module 32 and application electrical load 34 represent additional electrical components that receive power from power conversion/distribution system 28.

Second power circuit 16 similarly includes a motor/generator 36 and a GCU 38 coupled thereto. GCU 38 is also coupled to other components within second power circuit 16, such as a health monitoring and prognostics system 40, a thermal management system 42, and a power conversion/distribution system 44. Second power circuit 16 also includes an energy storage system 46, an expansion module 48, and application electrical load(s) 50. The components 36-50 of second power circuit 16 are similarly arranged as described with respect to first power circuit 14. Additionally, in one example electrical system 10 includes one or more additional motor/generators 52 and corresponding GCUs 54 as well, which may be coupled to a gas turbine engine as will be further described. Thus, the system 10 is modular and flexible in that it may be expanded to include a number N of motor/generators based on contemplated operating conditions.

Figure 2:
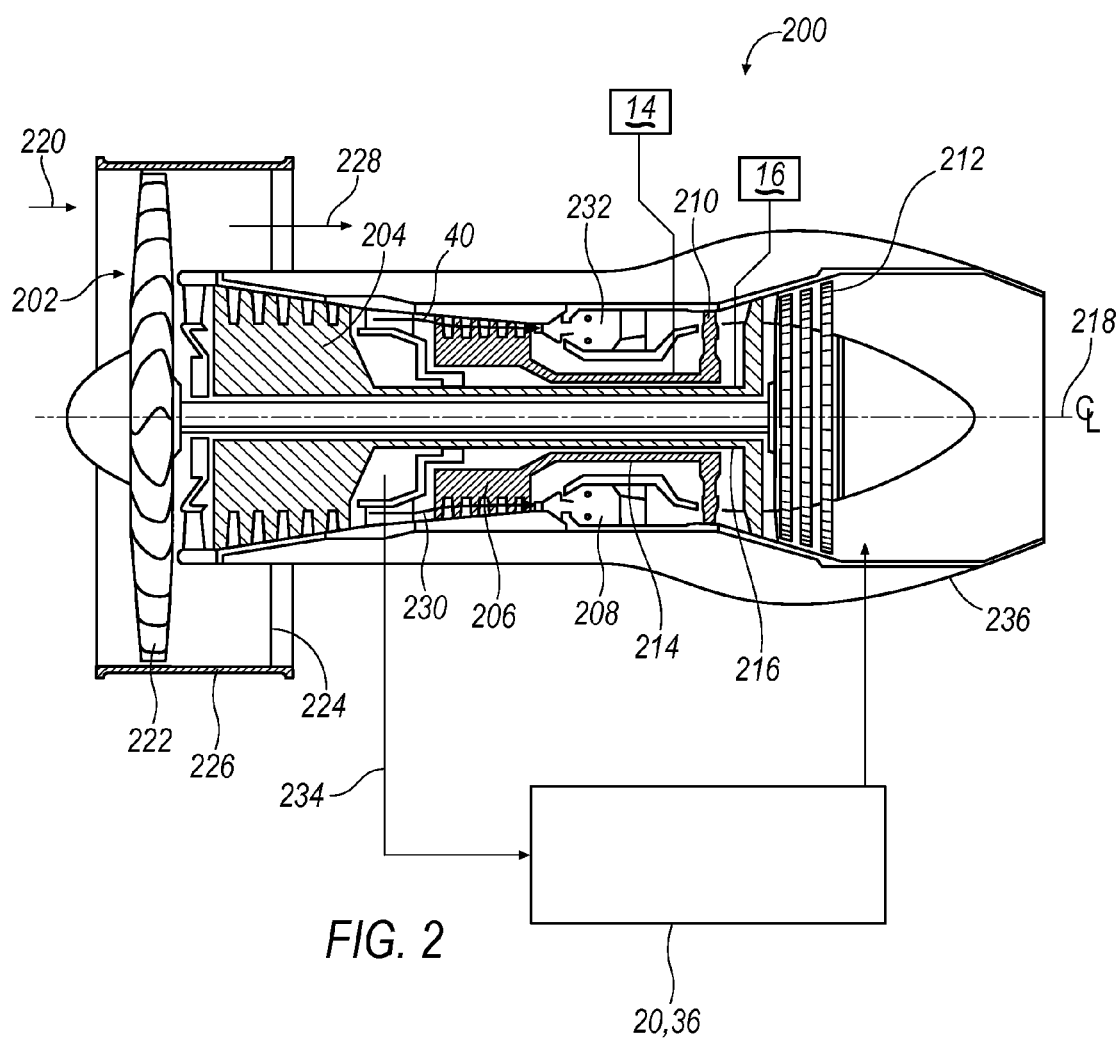
FIG. 2 illustrates an exemplary gas turbine engine that incorporates the electrical system illustrated in FIG. 1.

FIG. 2 illustrates a gas turbine engine 200, which includes a fan 202, a low pressure compressor and a high pressure compressor, 204 and 206, a combustor 208, and a high pressure turbine and low pressure turbine, 210 and 212, respectively. The high pressure compressor 206 is connected to a first rotor shaft 214 while the low pressure compressor 204 is connected to a second rotor shaft 216. The shafts extend axially and are parallel to a longitudinal center line axis 218. Ambient air 220 enters the fan 202 and is directed across a fan rotor 222 in an annular duct 224, which in part is circumscribed by fan case 226. Bypass airflow 228 provides engine thrust while a primary gas stream 230 is directed to a combustor 232 and the high pressure turbine 210.

First and second rotor shafts 214, 216, are coupled, respectively, to first and second power circuits 14, 16, as illustrated in FIG. 1. Thus, first and second power circuits 14, 16 are configured to split power between motor/generators 20, 36 so that each provides a portion of the power demand. As such, a power sharing/transfer arrangement between motor/generators 20, 36 provides the platform power demand, and includes a capability to provide power to one of the shafts 214, 216, as necessary. Such arrangement also provides an ability to optimize load shedding and a demand side management of the power requirement. Thus, life and performance considerations may be taken into account in real-time and optimized to actively seek and obtain performance optima while equipment is in operation.

The present disclosure contemplates diverting a fraction of the bleed air flow 234 through the gas turbine engine 200 for use in cooling either or both of the motor/generators 20,36. It may be controlled by the thermal management system 26, 42 or may have an independent control system. In one embodiment it is contemplated that the bleed air flow 234 may be returned to the nacelle 236 after use by the generator 20, 36. It should be understood that the bleed air flow 234 could be taken from any number of locations within the gas turbine engine 200 and similarly be exhausted in a variety of locations or even exhausted externally.

Figure 3:
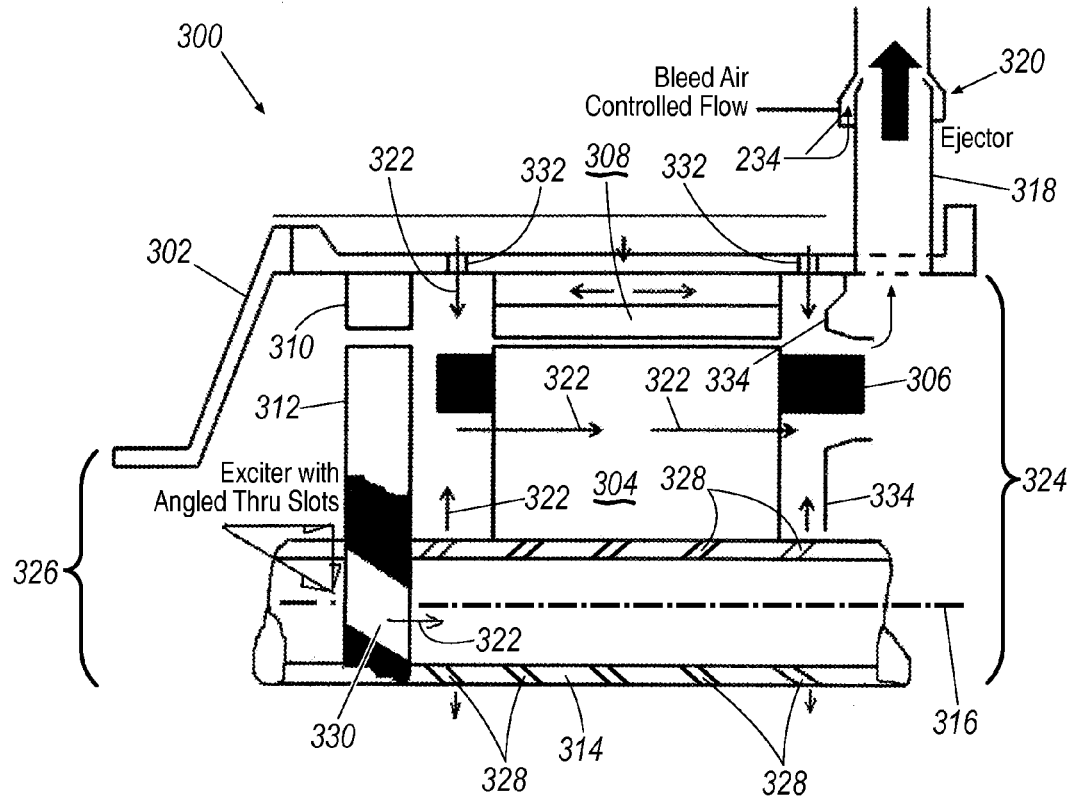
FIG. 3 illustrates an embodiment of a generator assembly incorporating a controlled air cooling amplifier.

FIG. 3 illustrates an embodiment of a generator assembly 300 incorporating the controlled air cooling amplifier. The generator assembly 300 includes a generator housing 302 containing a rotor assembly 304, a set of rotor windings 306, a stator assembly 308, an exciter stator 310 and an exciter rotor assembly 312. An input dive shaft 314 passes through the generator assembly 300 along a generator centerline 316. An ejector tube 318 is mounted to and in communication with the interior of the generator housing 302. The ejector tube 318 includes at least one fluid entrainment feature 320. Fluid entrainment features 320 utilize a small amount of high pressure air to accelerate a large volume of lower pressure air utilizing known fluid dynamics principles such as the Coanda effect or the Venturi effect. Although the present embodiment contemplates the use of a Coanda effect amplifier, one skilled in the art would recognize in light of this disclosure a variety of alternate features. The high pressure bleed air 234 is diverted into the fluid entrainment feature 320 which in turn generates a cooling air flow 322 throughout the generator housing 302. The fluid may also pass thru rotor 304, in passages between rotor windings. In the present embodiment, the fluid entrainment features 320 is located approximate a cooling air outlet end 324 of the generator housing 302 opposite a cooling air inlet end 326. This effectively pulls the cooling air flow 322 though the generator housing 302.

The generator assembly 300 additionally includes a variety of features that facilitate the passage of and disperse the cooling air flow 322 within the generator housing 302. The input drive shaft 314 is preferably a hollow drive shaft including a plurality of shaft apertures 328 positioned along its length within the generator housing 302. This allows the cooling air flow 322 to be pulled into the generator housing 302 through the input drive shaft 314 and dispersed radially outward to cool the various generator components. Although the shaft apertures 328 may be formed in a variety of fashions, in one embodiment it is contemplated that they are configured on an angle relative to the generator centerline 316 such that the spinning of the input drive shaft 314 serves to motivate the cooling air flow 322 radially outward.

Similarly, it is contemplated that the exciter rotor assembly 312 includes a plurality of rotor slots 330 formed therein to facilitate the movement of the cooling air flow 322 into and through the generator housing 302. The rotor slots 330 may also be orientated on an angle relative to the generator centerline 316 such that the rotation of the exciter rotor assembly 312 assists in moving the cooling air flow 322 into the interior of the generator housing. Finally, the generator housing 302 itself is contemplated to include a plurality of generator housing apertures 332 formed therein. The generator housing apertures 322 allow cooling air flow 322 to be brought in from the exterior of the generator housing 302. In addition when utilizes in combination with a generator shell 334 surrounding the generator housing 302, the generator housing apertures 332 allow a portion of the air from the cooling air inlet end 326 to be diverted to the exterior of the generator housing 302 prior to being pulled inside for cooling. Finally, a plurality of air guide baffles 334 may be positioned throughout the generator housing 302 to assist in guiding the cooling air flow 322 past critical components. Although the present embodiment has been described as including an ejector tube 318, it is contemplated that the fluid entrainment feature 320 may be incorporated directly into the generator housing 302.

Figure 4:
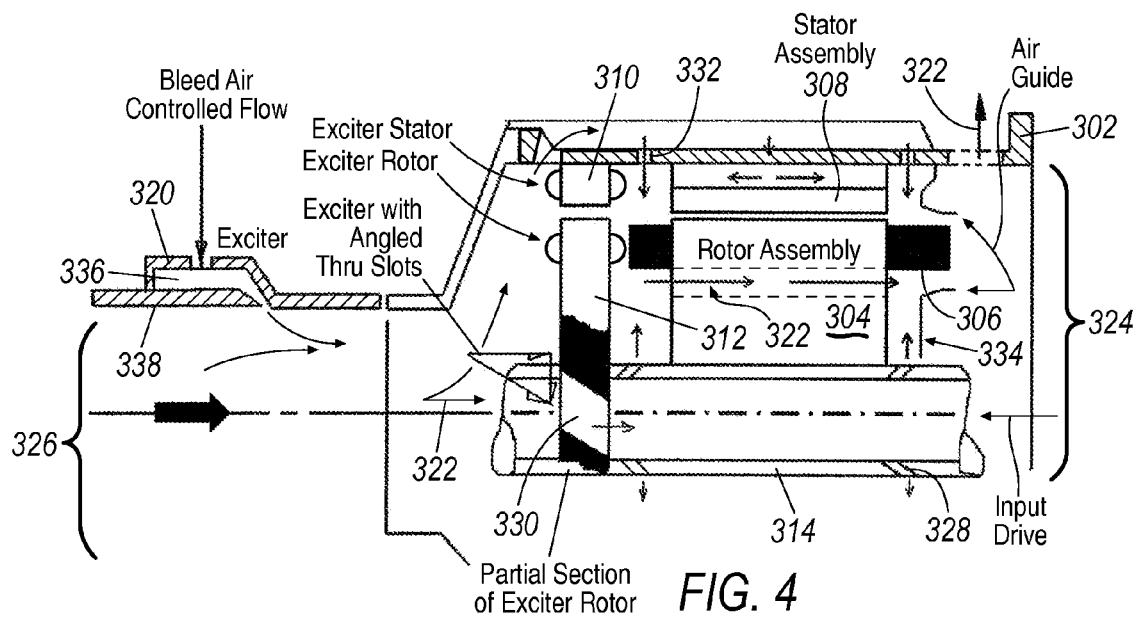
FIG. 4 illustrates a second embodiment of a generator assembly incorporating a controlled air cooling amplifier.

FIG. 4 illustrates an alternate embodiment of the generator assembly 300 wherein the fluid entrainment feature 320. The fluid entrainment feature 320 includes a pressurized annular chamber 336 with a controllable chamber flow guide 338 to produce the Coanda effect. The controllable flow guide 338 allows the amount of amplified cooling air 322 and resulting thermal cooling of the generator 300 to be precisely controlled. In this embodiment, the fluid entrainment feature 320 is mounted to the generator housing 302 proximate to the cooling air inlet end 326. This allows the cooling air flow 322 to be actively pushed through the generator housing 302 rather than pulled.

Figure 5:
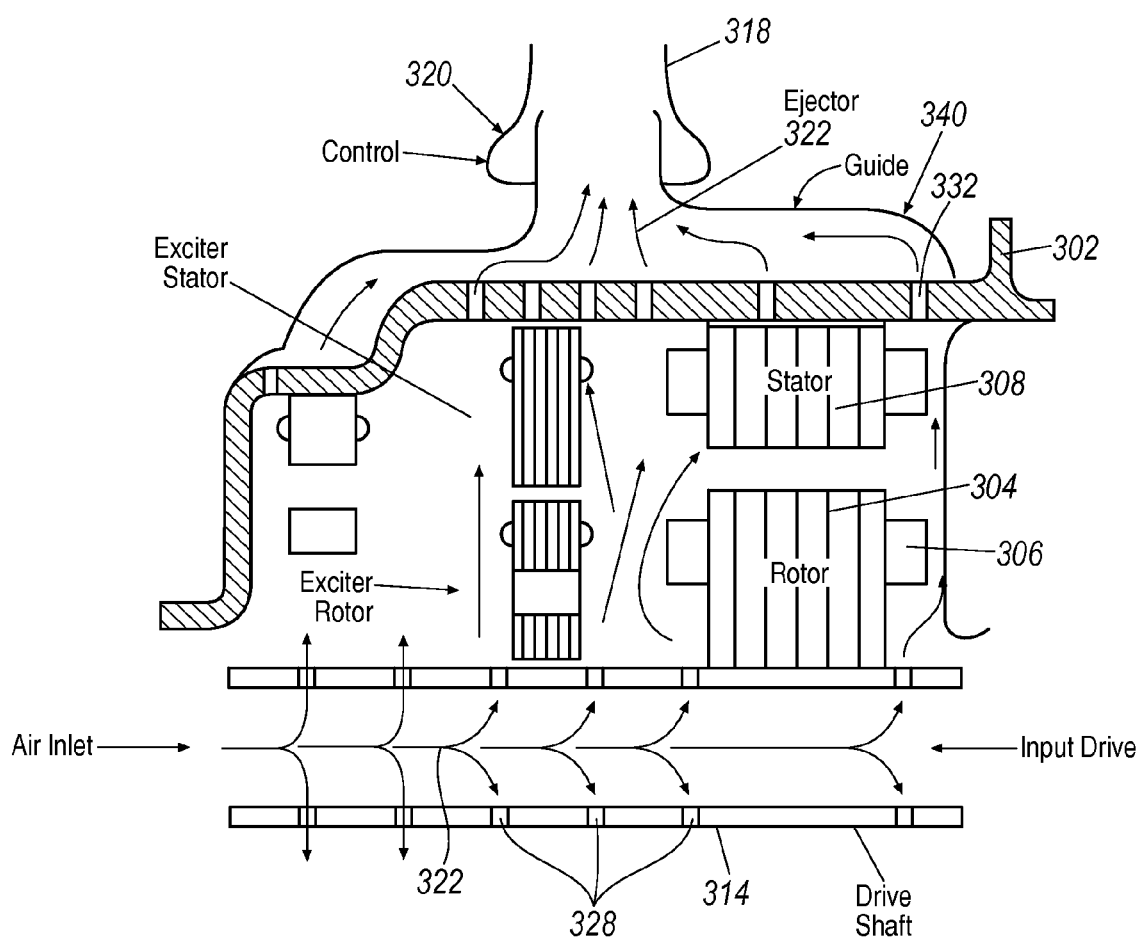
FIG. 5 illustrates a third embodiment of a generator assembly incorporating a controlled air cooling amplifier.

FIG. 5 illustrates a third embodiment of the generator assembly 300. In this embodiment, the fluid entrainment features 320 and optional ejector tube 318 are positioned radially outward of the generator housing 302. A housing flow guide 340 is in communication with both the ejector tube 318 and the generator housing 302 such that the cooling air flow 322 is pulled radially outward therefrom. In this embodiment, the cooling air flow 322 may be pulled radially outward from the input drive shaft 314 through the shaft apertures 328 and continue in a primarily radial direction until exiting the generator housing 302. This allows a unique pathway for the cooling air flow 322 and allows individual components to be cooled independently from neighboring components. It is further contemplated that the shaft apertures 328 may be positioned and sized to increase the cooling air flow 322 to components most in need of thermal management.

In each embodiment, the fluid entrainment feature 320 allows a modest pressurized bleed airflow 234 to be amplified into a high volume cooling air flow 322. In addition, the cooling air flow 322 may be controlled to provide constant mass air flow when used at altitude where air density varies. This provides a significant advantage over methodologies attempting to increase fan speed. Furthermore, this disclosure eliminates the need for a fan or fan shaft which reduces components and weight simultaneously. It should be understood, that the various features of each disclosed embodiment may be combined in a variety of fashions that would be understood to one skilled in the art in light of the present disclosure.

Computing devices such as system 10 generally include computer-executable instructions such as the instructions of the system controller 18, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A gas turbine generator cooling system comprising:
    a gas turbine engine generating bleed air; and
    a generator including a generator housing and at least one fluid entrainment feature, said at least one fluid entrainment feature utilizing a fraction of said bleed air to generate a cooling air flow through said generator housing.

2. A gas turbine generator cooling system as claimed in claim 1, wherein said at least one fluid entrainment feature comprises a Coanda effect feature.

3. A gas turbine generator cooling system as claimed in claim 1, wherein said generator further comprises:
    a hollow generator shaft including a plurality of shaft apertures positioned within said generator housing;
    wherein at least a portion of said cooling air flow is moved into said hollow generator shaft and dispersed into said generator housing through said plurality of shaft apertures.

4. A gas turbine generator cooling system as claimed in claim 1, wherein said generator further comprises:
    at least one exciter rotor including a plurality of rotor slots;
    wherein at least a portion of said cooling air flow is moved into said generator housing through said plurality of rotor slots.

5. A gas turbine generator cooling system as claimed in claim 4, wherein said plurality of rotor slots are angled relative to a generator centerline.

6. A gas turbine generator cooling system as claimed in claim 1, wherein said generator housing further comprises:
   a plurality of generator housing apertures formed along its length;
   wherein at least a portion of said cooling air flow is moved into said generator housing through said plurality of generator housing apertures.

7. A gas turbine generator cooling system as claimed in claim 1, wherein said generator housing comprises:
   a cooling air inlet end; and
   a cooling air outlet end;
   wherein said at least one fluid entrainment feature is positioned proximate to said cooling air outlet end such that said cooling air flow is pulled through said generator housing.

8. A gas turbine generator cooling system as claimed in claim 1, wherein said generator housing comprises:
   a cooling air inlet end; and
   a cooling air outlet end;
   wherein said at least one fluid entrainment feature is positioned proximate to said cooling air inlet end such that said cooling air flow is pushed through said generator housing.

9. A gas turbine generator cooling system as claimed in claim 3, wherein said generator housing comprises:
   a plurality of generator housing apertures formed along its length;
   wherein said at least one fluid entrainment feature is positioned radially outward of said generator housing such that said cooling air flow is pulled through said generator housing in an outward radial direction.

10. A gas turbine generator cooling system as claimed in claim 1, further comprising:
    at least one air guide baffle positioned within said generator housing, said at least one air guide baffle configured to route said cooling air flow relative to said generator housing.

11. A generator cooling system comprising:
    a generator including a generator housing and at least one fluid entrainment feature, said at least one fluid entrainment feature utilizing a portion of bleed air to generate a cooling air flow through said generator housing.

12. A generator cooling system as claimed in claim 11, wherein said at least one fluid entrainment feature comprises a Coanda effect feature.

13. A generator cooling system as claimed in claim 11, further comprising:
    a hollow generator shaft including a plurality of shaft apertures positioned within said generator housing;
    wherein at least a portion of said cooling air flow is moved into said hollow generator shaft and dispersed into said generator housing through said plurality of shaft apertures.

14. A generator cooling system as claimed in claim 11, further comprising:
    at least one exciter rotor including a plurality of rotor slots;
    wherein at least a portion of said cooling air flow is moved into said generator housing through said plurality of rotor slots.

15. A generator cooling system as claimed in claim 11, further comprising:
    at least one air guide baffle positioned within said generator housing, said at least one air guide baffle configured to route said cooling air flow through said generator housing.

16. A method of cooling a gas turbine generator comprising:
    bleeding air from the compressor of a gas turbine engine;
    directing a portion of said bleed air into at least one fluid entrainment feature in communication with a generator housing of a generator; and
    generating a cooling air flow through said generator housing using said at least one fluid entrainment feature.

17. A method of cooling a gas turbine generator as claimed in claim 16, wherein said at least one fluid entrainment feature comprises a Coanda effect feature.

18. A method of cooling a gas turbine generator as claimed in claim 16, further comprising:
    directing said cooling air flow through a hollow generator shaft, said hollow generator shaft including a plurality of shaft apertures positioned within said generator housing; and
    dispersing at least a portion of said cooling air flow into said generator housing through said plurality of shaft apertures.

19. A method of cooling a gas turbine generator as claimed in claim 16, further comprising:
    directing said cooling air flow through a plurality of rotor slots formed in at least one rotor; and
    dispersing at least a portion of said cooling air flow into said generator housing through said plurality of rotor slots.

20. A method of cooling a gas turbine generator as claimed in claim 16, further comprising:
    directing said cooling air flow through a plurality of generator housing apertures formed in said generator housing; and
    pulling at least a portion of said cooling air flow outwardly through said generator housing by positioning said at least one fluid entrainment feature radially outward of said generator housing.

* * * * *